United States Patent [19]
Reppert et al.

[11] 4,070,066
[45] Jan. 24, 1978

[54] DUAL WHEELS

[75] Inventors: Merlyn Ralph Reppert, Rancho Palos Verdes; James Albert Leslie, Carson, both of Calif.

[73] Assignee: W. R. Grace & Co., New York, N.Y.

[21] Appl. No.: 693,755

[22] Filed: June 8, 1976

[51] Int. Cl.² ............................................. B60B 11/00
[52] U.S. Cl. ................................................. 301/36 R
[58] Field of Search ............ 301/36 R, 36 A, 36 WP, 301/38 R, 38 S, 9 DN, 9 DP, 9 SB, 40 S, 13 R, 13 SM

[56] References Cited
U.S. PATENT DOCUMENTS

| 2,416,862 | 3/1947 | Baker ................................. 301/13 R |
| 2,840,422 | 6/1958 | Main et al. ......................... 301/63 R |
| 3,661,425 | 5/1972 | Verdier .............................. 301/63 R |

*Primary Examiner*—Robert B. Reeves
*Assistant Examiner*—H. Grant Skaggs
*Attorney, Agent, or Firm*—William Kovensky; William W. McDowell, Jr.

[57] ABSTRACT

Dual wheels for campers, autos, and the like light vehicles to be used in place of a single standard wheel are provided. The arrangement includes an inner wheel which has a portion to be attached to the standard studs on the vehicle wheel hub, and another portion carrying a similar set of studs upon which a second wheel can be mounted outboard of the inner wheel.

10 Claims, 4 Drawing Figures

DUAL WHEELS

This invention relates to wheels for vehicles, more specifically, to a simple but unique arrangement for mounting two wheels on a single vehicle wheel hub. Still more particularly, the invention pertains to such an arrangement for use in place of a single conventional vehicle wheel without the use of adaptors, and with no modifications to the vehicle wheel hub itself.

The advantages of dual wheels have been conclusively established in heavy duty trucks, off-road vehicles, construction equipment, and the like. These advantages reside primarily in the area of adding stability, increasing load capacity within the axle rating, increasing tire life, improving the braking and traction characteristics of the vehicle, and the like.

In recent times, efforts have been made to enable mounting dual wheels in place of single wheels on campers, light-duty trucks, family cars and the like for the above and other reasons. In an emergency situation, the invention outboard rear wheel can function as a spare at the front. Additionally, particularly with respect to campers and vans which are tall and thus can be unstable especially under windy conditions, and as to light-duty pick trucks, which tend towards small tires with respect to their load-carrying ability, a need for dual wheels to serve in the place of a conventional single wheel is present. Another advantage is added safety in the event of a blow-out of one of a pair of dual wheels. Yet another advantage of duals on such vehicles is that the ordinary citizen is thereby given at least somewhat of an "off-the-road" ability. That is, with dual traction wheels the family automobile, a camper, or a light truck can go on to sand as on a beach, or onto rocky terrain as in mountains, or may otherwise leave the highway and perform, at least to some limited extent in the nature of a "dune buggy" or a Jeep.

Numerous dual wheel systems and adaptors have been provided in the prior art. Such prior devices suffer from the disadvantages, all overcome in the present invention, that they are relatively complex and expensive, difficult to install, require various numbers of additional parts, such as adaptors, sleeves, struts, and the like. This latter point, incapability, is particularly important, in that the user, once having made the committment to some such prior systems, can no longer easily convert back to a conventional single wheel. In the present invention, both wheels are completely compatible. That is, the two wheels can be used together, or either wheel can be used alone like a single standard wheel.

The invention lends itself to use with other parts to constitute a conversion kit. Such other parts would include a specially formed fender to be bolted to the vehicle body or fender, to accommodate the additional extension of the dual wheels out from the vehicle. Yet another associated advantage is that the invention dual wheels, together with such fenders and other decorative parts, has the advantage of "jazzing up" the vehicle, which enhances its sales ability as a decorative feature, and thus constitutes yet another advantage of the invention.

The invention thus provides dual wheels which can be mounted in place of one standard wheel on virtually any sort of vehicle, and accomplishes this desiratum without the use of any separate parts, such as adaptors, extenders, struts, and the like which are commonly used in the prior art. Such separate parts are an added expense, add complexity to installation of dual wheels, accumulate tolerance which can cause radial runout, and are highly undesirable in general.

Thus the invention provides dual wheels of the character described which is readily adapted to convert a single wheel installation on an automobile or other vehicle to dual wheels with no adaptors or other superfluous parts, and which is simple, strong, durable, simple to manufacture, of relatively low cost, and yet safe and highly reliable in use.

The above and other advantages of the invention will be pointed out or will become evident in the following detailed description and claims, and in the accompanying drawing also forming a part of the disclosure, in which:

Figure 1:
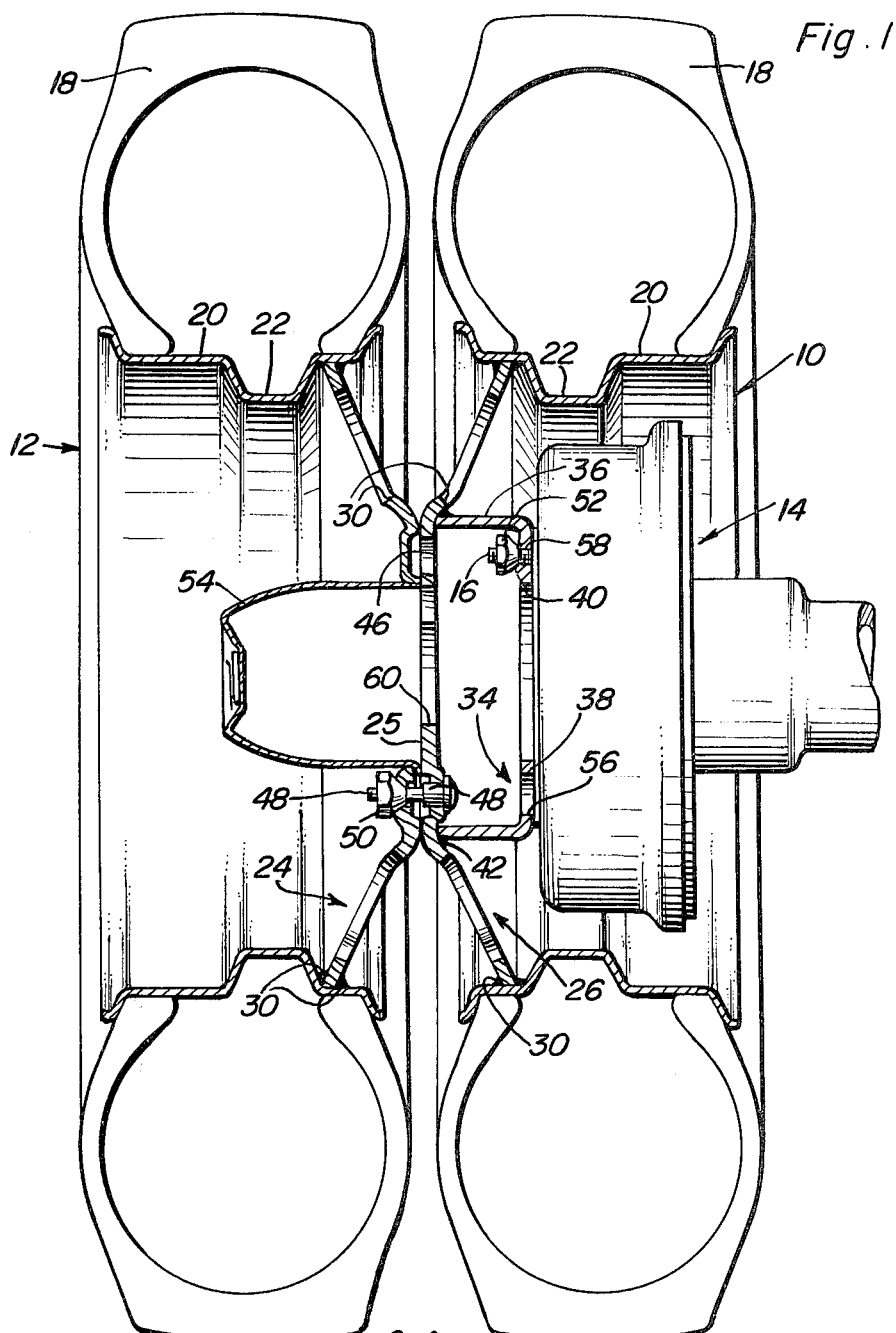
FIG. 1 is a vertical cross-sectional view of a dual wheel arrangement embodying the invention installed on a vehicle.

Referring now in detail to the drawing, the invention comprises an inner wheel 10 and an outer wheel 12 which are mounted on a vehicle brake drum or hub 14 using the circle of conventional wheel studs 16. The part 14 is conventional, and need not to be described in any further detail herein. Only a single one of these studs 16 appears in FIG. 1, it being understood that there will usually be four, six, or more of such studs in a circle of predetermined diameter. Smaller automobiles usually have four studs, larger cars usually have five, and pickup trucks usually have five, six or eight. It is, of course, a simple matter to provide a configuration of the invention to cooperate with any one of such stud arrangements on the hub 14 of the vehicle, to thereby adapt the invention for use with virtually any sort of vehicle.

A pair of tires 18 are mounted on tire rim portions 20 of the inner and outer wheels 10 and 12 in the conventional manner. It should be noted that the rims 20 of the two wheels may be identical, differing only in the locations of their drop center portions 22, as will be explained in greater detail below.

Wheel 12 comprises a center portion 23, and wheel 10 has a center portion 26. Each center 24 and 26 is welded, as by a plurality of welds 28, to its respective rim 20 at the shallow side of the drop center 22 thereof, as can be seen best in FIG. 1. The centers 24 and 26 may be heavy gauge steel stampings having a plurality of holes 30 therein. The holes serve to cool the brakes, to reduce the weight of the wheel, and to produce a pleasing decorative appearance. Of course, other kinds of wheel centers, as are well known in the art, could also be used.

The two wheel centers 24 and 26 are dished or dishlike in configuration. Each is joined to the rim 20 on the shallow side of the drop center portion 22 thereof, and extends outwardly, i.e., away from the drop center. Thus, when the two wheels are joined together in use, as shown in FIG. 1, the dishing of the centers locates the rims, and hence the tires 18 mounted thereon, relatively far apart, to thus assure that the tires do not touch each other in use. This is particularly important because of the increasing use of wider profile automobile and truck tires. Further, the provision of the centers at the shallow side of the rims permits the location of the dual wheels closer in towards the centerline of the vehicle. That is, as shown in FIG. 1, the rim 20 of the inner wheel 10 overlies the hub 14 to thereby "pull" the dual wheels 10 and 12 as close in as possible. Where the center 26 located at the drop center, or on the deep side of the rim, the dual wheels would extend out further from the vehicle, thus producing undesirable performance characteristics.

It is another advantage of the invention in reducing its cost of manufacture that the two centers 24 and 26 are very similar to each other and may be made from the same blank.

It is another advantage of the invention that the outer wheel 12 together with its center 24, and the pattern of holes provided therein for the studs, may be conventional. That is, the outer wheel 12 could be bolted directly onto the conventional stud circle 16 on the brake hub 14. Of course, if required in an emergency or to release the outer wheel for use as a spare, the inner wheel could also be used by itself. One of these bolt holes 32 in the center 24 of the outer wheels appears in FIG. 4.

Figure 2:
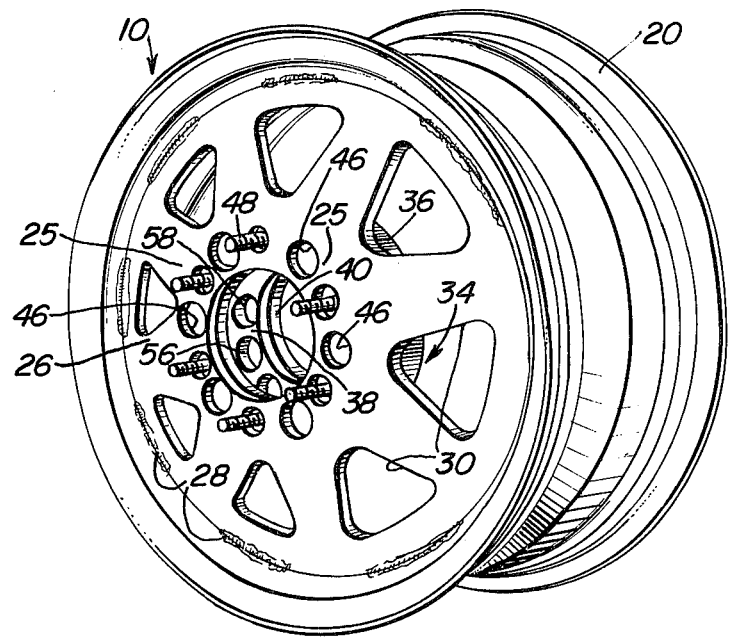
FIG. 2 is a perspective elevational view of the inner wheel of the invention.
Figure 3:
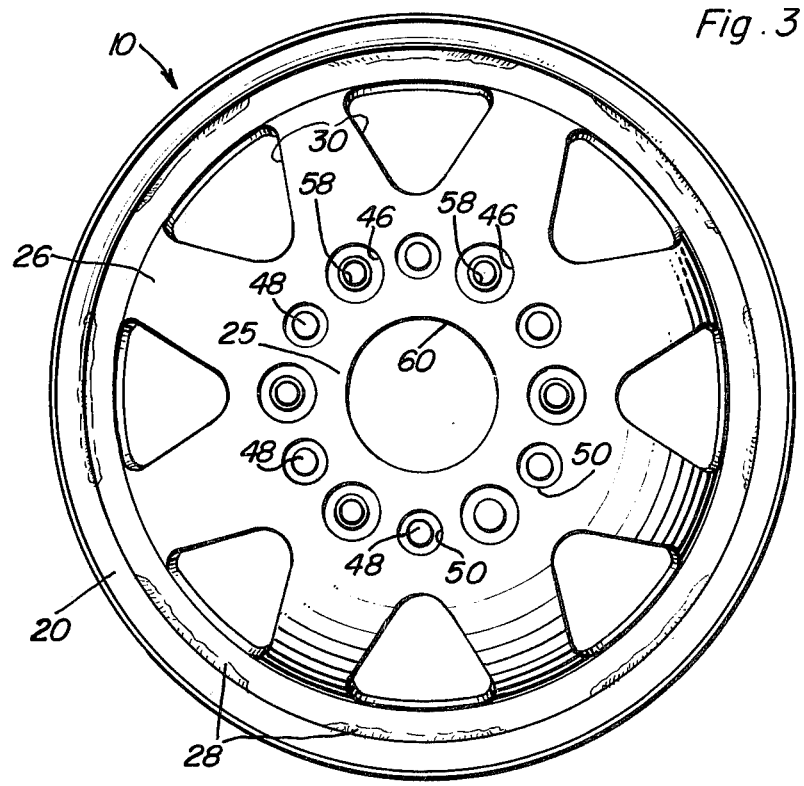
FIG. 3 is a front elevational view thereof.

The inside or middle portion of the inner wheel center 26 comprises an annular wall 25 which is flat, and is defined by a center opening 60. The outside of this wall portion 25 blends into the portions between holes 30 to define the dish-like shape, see FIGS. 1 and 2.

Wheel 10, at the hub side of middle portion 25, is provided with a cup or basket member 34. Member 34 is of generally cup-like configuration, comprising an outer cylindrical wall 36 and an annular wall 38 which is provided with a central opening 40, which cooperates with opening 60 to permit the use of automatic tire changing equipment on inner wheel 10. Wall portions 25 and 38 are in overlying spaced relation, see FIG. 1. The free end of the cylindrical wall 36 is welded as to 42 to the inside of wall 25 to permanently maintain concentricity. Wall portion 25 is provided with a circle of enlarged clearance openings 46, which are spaced one between each two of a circle of bolts 48 provided in suitable dimpled and pierced openings 50. Conventional nuts 52 are provided on the bolts 48 to hold the outer wheel 12 onto the inner wheel 10. Inner wall 38 of member 34 is utilized for attaching the inner wheel, and hence the outer wheel assembled thereon, onto hub 14.

Thus, in overall effect, it can be seen that the inner wheel 10 provides a row of studs 48 on its external surface which are equivalent to the vehicle wheel hub studs 16. In this manner, the invention inner wheel 10, in effect, moves the stud circle outwardly to the outside of the inner wheel.

Figure 4:
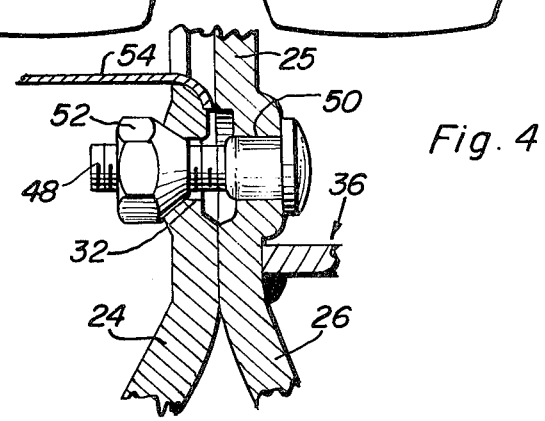
FIG. 4 is an enlarged view of a detail.

As shown in FIG. 4, the dimpling in the area of the bolt holes 50 in the inner wheel center 26 is provided both for the conventional reasons of permitting a secure attachment of the two wheels together, and also for the reason of permitting the mounting of the lip of a decorative hub cap 54 between the wheels. Of course, the hub cap 54 could be omitted if desired.

Wall 38 is provided with a first row of clearance openings 56, and a second set of bolt openings 58, equal in number to the openings 56 and spaced one between each two openings 56. Further, the clearance openings 56 are arranged to underlie each of the bolts 48, and the clearance openings 56 in the center 26 are arranged to overlie the openings 58. The openings 58 receive the bolts 16 from the hub 14, and are attached thereto with conventional nuts 50. The openings 46 in the center 26 serve to permit wrench access to these nuts. The clearance openings 56 in the bottom of the cup member serve to facilitate the assembly of the studs 48 into their openings 50 in wall 25.

While the invention has been described in detail above, it is to be understood that this detailed description is by way of example only, and the protection granted is to be limited only within the spirit of the invention and the scope of the following claims.

We claim:

1. An inner wheel for use with dual vehicle wheels comprising a tire rim and wheel center, said rim having a drop center portion defining a shallow side of said rim, a single member integrally mounted on said inner wheel having a radially extending wall portion located in spaced relation to a middle portion of said inner wheel center, said radially extending wall portion being formed with a set of openings to receive the wheel mounting studs on a vehicle hub, and nuts on said studs for securing said inner wheel via said radially extending wall portion to said vehicle hub, said middle portion being provided with a set of openings equal in number to and aligned with said set of openings in said member; whereby access for a tool may be had through said inner wheel center openings to said nuts securing said inner wheel on the vehicle hub studs; means for mounting an outer wheel on said inner wheel comprising a set of wheel mounting studs on said inner wheel middle portion, and said wheel mounting studs on said inner wheel being equal in number to and spaced one between each two openings of said set of openings in said middle portion.

2. The combination of claim 1, wherein said single member is of cup-like configuration and comprises an annular end wall and a cylindrical wall, weld means joining the free end of said cylindrical wall to said middle portion, and said radially extending wall portion comprising said annular wall.

3. The combination of claim 1, wherein said wheel center is of a generally dish-like configuration and is joined to said tire rim at said shallow side of the drop center of said rim, and said middle portion being positioned outwardly of said rim drop center of said shallow side thereof.

4. The combination of claim 3, and an outer wheel comprising a center and a rim, said outer wheel rim being substantially identical to said first mentioned wheel rim, wherein said outer wheel center is of a generally dish-like configuration and is joined to its tire rim at the shallow side of the drop center of said rim, and wherein said outer and inner wheel are mounted on a vehicle with their rim drop center shallow sides in facing relation.

5. The combination of claim 1, wherein said spaced wall portion is formed with a second set of openings equal in number to said first set, with each opening of each set being located between a pair of openings of the other set, and said second set of openings being aligned with said studs on said middle protion, whereby access may be had through said second set of openings to assemble said studs onto said inner wheel center.

6. The combination of claim 1, wherein said set of studs on said middle portion are equal in number and positioning to the set of studs on the vehicle hub.

7. Dual vehicle wheels comprising an inner wheel and an outer wheel each comprising a tire rim and a wheel center, said tire rims being similar to each other, each of said tire rims comprising a drop center portion defining a shallow side of said rim, said inner wheel comprising a member joined to the hub side of said inner wheel center and comprising a radially disposed wall portion located in inwardly spaced relation to the middle portion of said inner wheel center, said radially disposed wall portion being formed with a set of openings to receive the wheel mounting studs on a vehicle hub and nuts on said studs for securing said inner wheel via said radially extending wall portion to said vehicle hub, said inner wheel center middle portion being provided with a set of openings equal in number to and aligned with said set of openings in said radially disposed wall portion, whereby tool access may be had through said openings in said inner wheel center to said nuts on the vehicle hub studs; a set of studs on said inner wheel center extending outwardly thereof for mounting said outer wheel on said inner wheel, and said outer wheel mounting studs on said inner wheel being equal in number to and spaced one between each two openings of said set of openings in said inner wheel center.

8. The combination of claim 7, wherein said wall portion is formed with a second set of openings equal in number to said first set, with each opening of each set being located between a pair of openings of the other set, and said second set of openings being aligned with said studs on said inner wheel center, whereby access may be had through said second set of openings to assemble said studs to said inner wheel center.

9. The combination of claim 7, wherein said single member is of cup-like configuration and comprises an annular end wall and a cylindrical wall, weld means joining the free end of said cylindrical wall to said middle portion, and said radially extending wall portion comprising said annular wall.

10. The combination of claim 7, wherein said inner and outer wheel centers are of generally dish-like configuration and each is joined to its tire rim at the shallow side of the drop center of said rim, and wherein said outer and inner wheels are mounted on the vehicle with said shallow sides together.

* * * * *